INVENTOR.
BERT ZAUDERER

United States Patent Office 3,430,081
Patented Feb. 25, 1969

3,430,081
MERCURY VAPOR FOR MAGNETOHYDRODYNAMIC GENERATORS
Bert Zauderer, Bala, Pa., assignor to the United States of America as represented by the Secretary of the Air Force
Filed Dec. 2, 1964, Ser. No. 415,521
U.S. Cl. 310—11    3 Claims
Int. Cl. G21d 7/02; H02k 45/00; G21c 15/00

ABSTRACT OF THE DISCLOSURE

A system for generating electrical power including a closed loop nuclear reactor heating system; a closed loop MHD generator utilizing mercury vapor seeded with barium and a heat exchanger connecting the two loops, whereby the nuclear reactor heats the mercury vapor working fluid of the generator.

---

This invention relates generally to magnetohydrodynamic generators and more specifically to a new working fluid which permits a more efficient magnetohydrodynamic generator than has heretofore been possible.

The magnetohydrodynamic generator (hereinafter called MHD) produces electrical current by passing an ionized gas or vapor heated to more than 1500° K. through a magnetic field. The high temperature plasma, consisting of ionized atoms and electrons, converts its energy directly into electrical energy in much the same way that a conventional generator passes a wire through a magnetic field. The plasma passes through the generator cutting the magnetic lines of force and generates a voltage within the gas. The electrical power is extracted from the flow of electrons by means of appropriately placed electrodes.

One basic consideration for an effective MHD generator is the utilization of plasma which is a good conductor. For practical purposes, ordinary partially ionized gas is not adequately conductive for MHD operation but it has been found that seeding the gas with metal will raise the electrical conductivity sufficiently to permit fairly efficient performance.

Problems have been encountered, however, in obtaining practical seeding materials. Alkali metals such as potassium and cesium have been found to attack the electrodes of the MHD generator when coated with an oxide to promote electron emission.

Some of the gases commonly used include ordinary air or inert gases such as helium and argon which are all relatively inefficient.

It is therefore an object of this invention to provide a new and more efficient plasma for use in MHD generators.

It is a further object of this invention to provide a plasma of materials which have sufficiently high vapor pressure at relatively low temperature to permit low pressure operation of a MHD generator.

It is another object of this invention to provide a vapor for a MHD generator which may be used in outer space.

It is still another object of this invention to provide a vapor for a MHD generator which may be utilized as a topping device for steam power plants.

It is still a further object of this invention to provide a mixture for MHD generators wherein the resultant degree of ionization and conductivity will be greater than the thermal equilibrium value.

It is another object of this invention to provide a novel method of generating electrical power.

It is another object of the invention to provide a vapor for a MDH generator which is economical to produce and utilizes conventional, currently available components that lend themselves to standard mass production manufacturing techniques.

Figure 1:
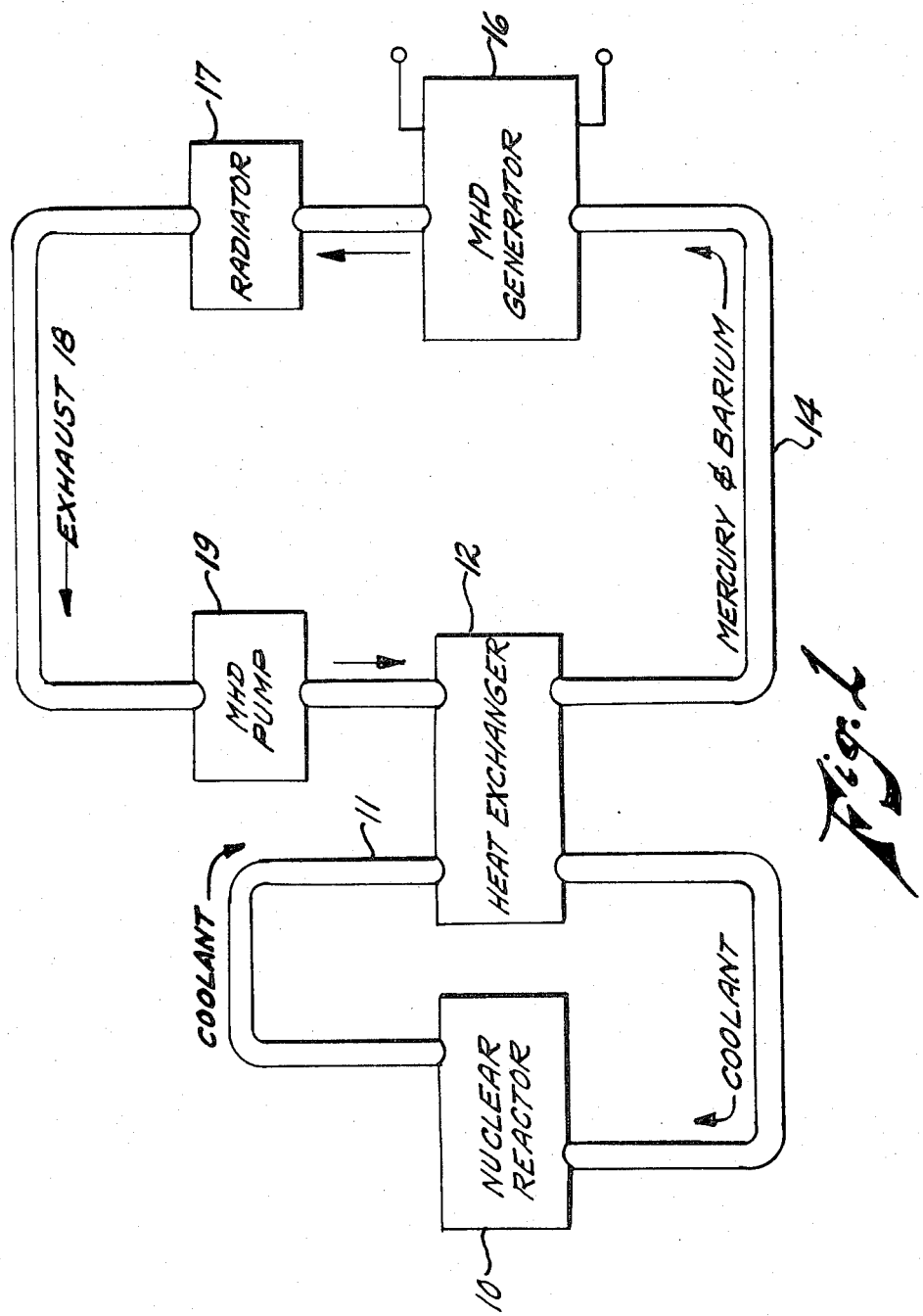
Figure 2:
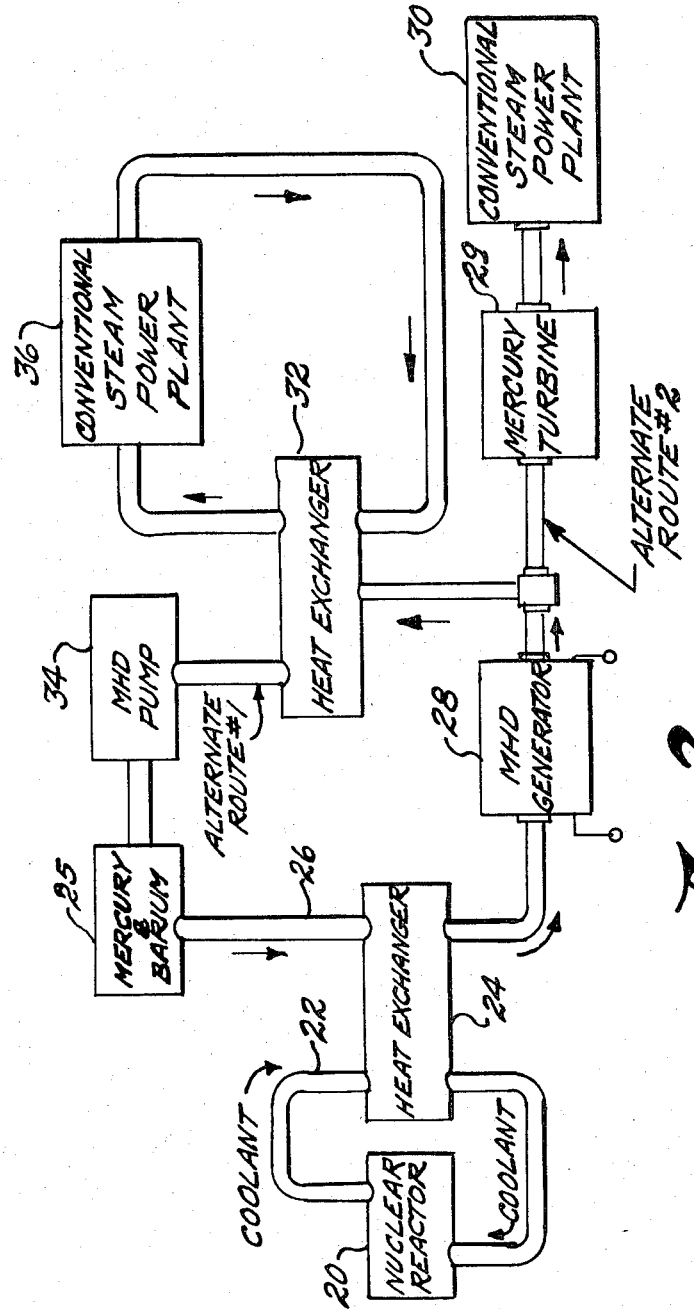

These and other advantages, features and objects of the invention will become more apparent from the following description taken in connection with the illustrative embodiments in the accompanying drawings, wherein:

FIG. 1 diagrammatically illustrates a MHD system capable of use in a space environment; and FIG. 2 diagrammatically illustrates a MHD system used as a topping device for a conventional steam power plant.

With the increased use of earth satellites and interplanetary space probes a serious problem has arisen attempting to sustain reliable electrical power for the instrumentation aboard such vehicles for extended periods. The nuclear reactor is one answer to this problem.

In utilizing nuclear reactors for MHD power generation in outer space a radiator is needed to reject the heat. The MHD generator utilizes a high inlet and outlet temperature, however, due to the possibility of core melt down and other metallurgical requirements, the nuclear reactor is limited to a relatively low temperature, in the order of 1500° K.

Ordinarily, at this temperature, the thermal degree of ionization of the seed and the overall gas conductivity would be low, but by utilizing the induced electric field of the MHD generator the electrons will be heated enough to raise the conductivity to usable proportions.

It can be shown that a vapor cycle is more efficient than a gas cycle for MHD operation in outer space. I have discovered that by using mercury vapor seeded with a small amount of barium (one percent has been found adequate) as the working fluid, added conductivity is obtained.

This is explained as follows: In the MHD generator there exists two electric fields called the Faraday and Hall fields. The former is given by the expression $(\vec{V}\times\vec{B})$, where $\vec{V}$ is the gas velocity and B the magnetic flux density. The latter depends on the generator electrode configuration. Its maximum value is obtained in the infinitely segmented electrode generator operated under short circuited conditions. In this case the Hall field is given by $\beta(\vec{V}\times\vec{B})$ where $\beta$ is the product of the electron cyclotron frequency times the electron-atom and/or electron-ion mean collision time. At high enough fields the Hall field can be as much as an order of magnitude greater than the Faraday field. It is this field which will be utilized to heat the electrons sufficiently to excite the $^3P_2$ state of Hg which has an excitation potential of 5.4 e.v. This reaction proceeds thusly:

$$e+{}^1S_0(Hg)\rightarrow e+{}^3P_2(Hg)$$

where $e$ is the electron and the other symbols are the usual spectroscopic notation for mercury. The $^3P_2$ state is metastable and can lose its energy only by collision with an electron or an atom. Barium has an ionization potential of 5.2 e.v., thus, it is nearly in resonance with the $^3P_2$ state of mercury. Therefore, if this $^3P_2$ (Hg) atom should collide with ground state barium, the probability will be great that the barium will be ionized in the following reactions:

$$^3P_2(Hg)+{}^1S_0(Ba)\rightarrow {}^1S_0(Hg)+{}^2S_{1/2}(Ba)+$$

where $^1S_0$ (Ba$^+$) is the barium ion ground state. This mixture satisfies Wigner's rule of spin conservation, hence, the cross section for this process should be large.

Quantum mechanically, the mixture of krypton and mercury would work, but for MHD operation it is undesirable because in the mixture $^3P_n$ (krypton) plus one percent mercury the ionization potential of mercury is too high.

Another possible seeding material for mercury is potassium. Generally, the alkali metals do not satisfy Wigner's conservation in all collisions, for example, in Hg+K the two consecutive reactions are:

(1) $\quad e^- + {}^1S_0(Hg) \rightarrow e^- + P_0(Hg)$ (2) $\quad {}^3P_0(Hg) + {}^2S_{1/2}(K) \rightarrow {}^1S_0(Hg) + {}^1S_0(K^+) + e^-$ Examining the spins in reaction (2), it is found that in only 50 percent of the collisions will spin be conserved.

Since the ionization potential of potassium is 4.34 e.v. and the $^3P_0$ metastable state of Hg is 4.6 e.v., reaction (2) is energetically possible. However, since the spins are not always conserved the efficiency is lower than in a mercury-barium mixture even though the ionization potential of potassium is 0.9 volt lower than that of barium. It is clear that no advantage exists by using mercury plus lithium or mercury plus sodium since their ionization potentials are equal or greater than that of barium. Mercury plus cesium is also unsatisfactory due to the large energy discrepancy between them. Furthermore, it has been found that mercury plus alkali metals may amalgamate explosively.

While it is envisaged that the induced fields in the MHD generator will heat the electrons, the use of the mercury-barium working fluid is not restricted to this mode of electron heating. An externally applied electric field at the entrance of the generator or an electron beam can also be utilized to heat the electrons and populate the mercury metastables.

Referring now to FIG. 1, there is shown a system that would employ this novel mixture. The nuclear reactor 10 produces sufficient heat to circulate the coolant 11 through a closed loop to the heat exchanger 12. The heat is transferred to the mercury seeded with about one percent barium (14) which becomes somewhat ionized. The vapor then moves to the MHD generator 16 where the induced electric field raises the conductivity of the vapor to the level necessary for the MHD to produce electrical current.

The exhaust 18 then passes through the radiator 17 and/or condenser where the heat is rejected to outer space or to the atmosphere of the earth. It then passes through a liquid MHD pump 19 or a rotating compressor where its original stagnation pressure is restored. The advantage of using a MHD pump is that the entire cycle has no moving parts and is thus ideal for space applications. It is to be noted that a MHD pump can be utilized if the mercury is in the liquid or vapor state.

An alternate use of this mixture is with a conventional steam power plant as shown in FIG. 2. The nuclear reactor 20 heats the coolant 22 which is circulated into the heat exchanger 24. The heat exchanger heats the mercury vapor seeded with barium (26) from the reservoir 25. The MHD generator 28 raises the conductivity of the mixture in the aforementioned manner. The exhaust from the generator is then directed to a conventional mercury turbine 29 which is part of a conventional steam or mercury power plant 30. Alternatively, the mercury can be passed through a heat exchanger 32 where the mercury is cooled by heating steam which is part of a conventional steam power plant 36. The mercury is then recycled through the MHD pump 34 as disclosed in FIG. 1. The MHD generator in this instance acts as a topping device which would preheat the gasses entering the combustion chamber of the steam plant.

Although the invention has been described with reference to particular embodiments, it will be understood to those skilled in the art that the invention is capable of a variety of alternative embodiments within the spirit and scope of the appended claims.

I claim:

1. In an electrical power generating system the combination of a nuclear reactor for producing heat, a magnetohydrodynamic generator to produce electrical current, a heat exchanger to accomplish heat transfer from said reactor to said generator and a working fluid for said generator consisting of mercury vapor seeded with barium.

2. A method of generating electrical power comprising the steps of heat a working fluid consisting of mercury vapor seeded with one percent barium to about 1500° K., passing said vapor through a magnetohydrodynamic generator to produce electrical current and returning the mercury barium vapor to be reheated and recycled.

3. A method of generating electrical power comprising the steps of heating a working fluid consisting of mercury vapor seeded with barium, passing the mixture through a magnetohydrodynamic generator to produce electrical current and exhausting the used mixture into a steam power plant to act as a topping device therefor.

References Cited

UNITED STATES PATENTS

| | | | |
|---|---|---|---|
| 1,839,502 | 1/1932 | Rudenberg et al. | 313—229 X |
| 2,354,031 | 7/1944 | La Forge | 313—229 X |
| 3,102,224 | 8/1963 | Maeder | 322—47 |
| 3,149,252 | 9/1964 | Lapp | 310—11 |
| 3,258,909 | 7/1966 | Davis et al. | 60—35.5 |

OTHER REFERENCES

Engineering Aspects of Magnetohydrodynamics (3rd Symposium) edited by Mather and Sutton; Paper Given Mar. 28, 1962 by Carter and Laubenstein; pp. 291 and 292.

Discovery (The Magazine of Scientific Progress), August 1961; pp. 326, 330 and 331; published London, England.

Journal of Engineering for Power; October 1961, pp. 37 and 400; from transactions of ASME.

DAVID X. SLINEY, *Primary Examiner.*

U.S. Cl. X.R.

176—65